United States Patent
Khodor

(10) Patent No.: US 10,392,041 B1
(45) Date of Patent: Aug. 27, 2019

(54) FOLDING CHASSIS FOR MANUALLY DRIVEN CARRIER VEHICLES

(71) Applicant: TRIFOLD, LLC, Orange, OH (US)

(72) Inventor: Leonid Khodor, Orange, OH (US)

(*) Notice: Subject to any disclaimer, the term of this patent is extended or adjusted under 35 U.S.C. 154(b) by 0 days.

(21) Appl. No.: 16/102,365

(22) Filed: Aug. 13, 2018

(51) Int. Cl.
*B62B 1/12* (2006.01)
*B62B 1/00* (2006.01)

(52) U.S. Cl.
CPC ............... *B62B 1/12* (2013.01); *B62B 1/008* (2013.01); *B62B 2205/003* (2013.01); *B62B 2205/12* (2013.01)

(58) Field of Classification Search
CPC .. B62B 1/02; B62B 1/042; B62B 1/12; B62B 2205/12; B62B 2205/33; B62B 3/02; B62B 2206/006; B62B 5/067
See application file for complete search history.

(56) References Cited

U.S. PATENT DOCUMENTS

| | | | |
|---|---|---|---|
| 3,241,852 A | 3/1966 | Muler et al. | |
| 3,659,867 A | 5/1972 | Curry | |
| 5,072,958 A | 12/1991 | Young | |
| 5,439,239 A | 8/1995 | Su | |
| 5,630,601 A * | 5/1997 | vom Braucke | B62B 1/12 280/40 |
| 5,984,327 A | 11/1999 | Hsieh | |
| 7,097,183 B1 | 8/2006 | Su | |
| 7,387,306 B2 | 6/2008 | Zimmer | |
| 9,187,106 B2 | 11/2015 | Khodor | |
| 2015/0091264 A1* | 4/2015 | Herbault | B62B 5/003 280/35 |
| 2018/0096155 A1* | 4/2018 | Ryu | G06F 3/12 |

* cited by examiner

*Primary Examiner* — Bryan A Evans

(57) ABSTRACT

Disclosed is a foldable chassis of manually driven carrier vehicles capable of self-locking in unfolded position. The chassis includes a frame having a reference plane, an actuator attached pivotally to said frame, a first mechanism comprising said actuator and a platform attached pivotally to said frame, and a second mechanism comprising said actuator and two arms, each attached to said frame pivotally around a first axis and configured for attaching a wheel arrangement rotatable around a second axis. Said first and second mechanisms configured to move independently of each other between at least a first position, in which said platform generally perpendicular to said frame and said wheel arrangements generally perpendicular to said reference plane, and a second position, in which said platform adjacent to said frame and said wheel arrangements adjacent and parallel to said reference plane.

9 Claims, 7 Drawing Sheets

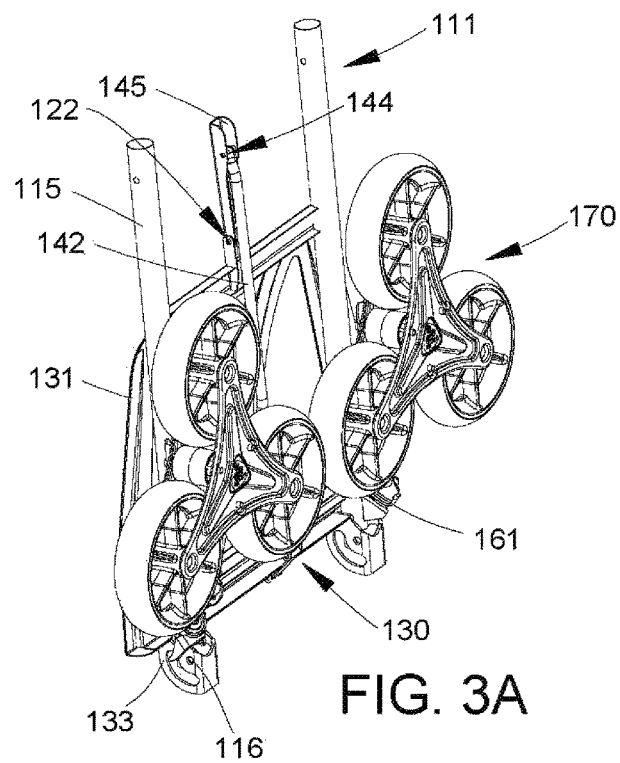
FIG. 3A
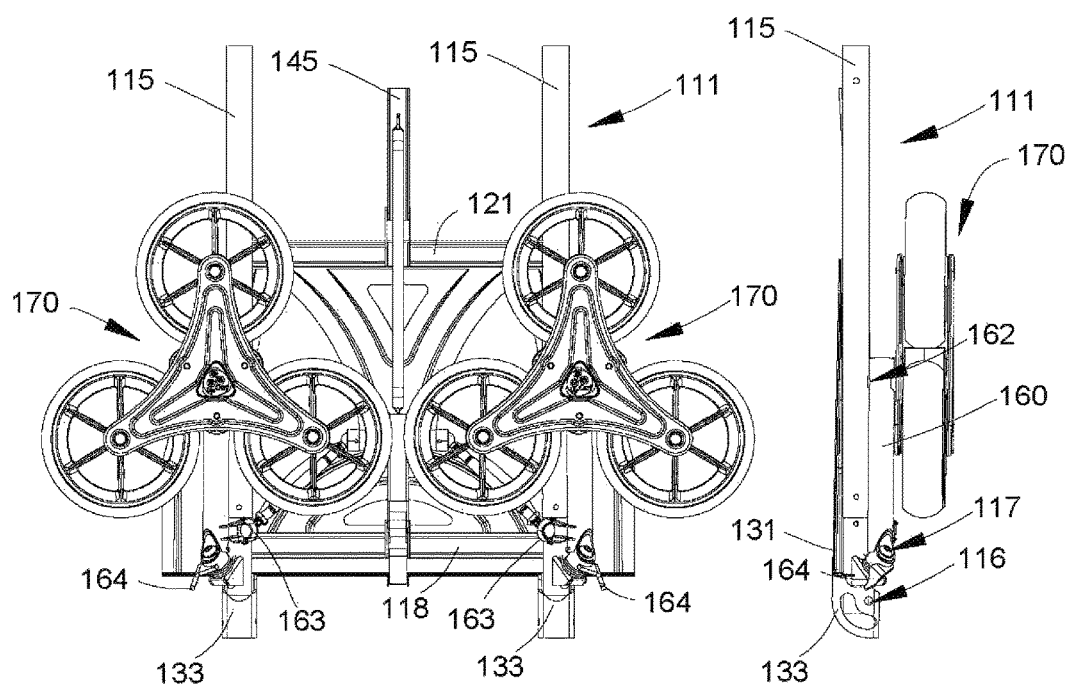
FIG. 3B
FIG. 3C

FOLDING CHASSIS FOR MANUALLY DRIVEN CARRIER VEHICLES

FIELD OF THE INVENTION

The present invention generally relates to manually driven carrier vehicles, such as carts and hand trucks and, more particularly, to a folding chasses of such vehicles.

BACKGROUND OF THE INVENTION

Various manually driven carrier vehicles, for example, hand trucks and carts, are commonly used for moving objects that are otherwise inconvenient for a person to carry due to their number, size, and/or weight. Often, these vehicles have foldable chassis for ease of storage and transportation when not in use. These carriers typically have a frame with telescoping or folding handle and chassis comprising folding platform and wheels mounted on either a single axle or separate foldable arms. Chassis with wheels mounted on the single axle and some with the foldable arms have independently folding platform. However, chassis with interdepended folding of the platform and arms offer more compact option. The latter utilize either cam or gear mechanisms. Neither are lockable by themselves and require additional means and actions to prevent inadvertent folding. These means add complexity and expense to designing and manufacturing of the chassis and make handling of the carrier somewhat challenging for an average consumer.

Therefore, it is desirable to provide folding carrier chassis capable of being, at least, unfolded into a positively locked position by a single action. Additionally, it is desirable to have such carrier chassis be foldable relatively flat to provide for ease of storage and transportation.

SUMMARY OF THE INVENTION

The present invention generally focuses on foldable chassis of manually driven carrier vehicles capable of self-locking in unfolded position. In addition, the invention provides for a carrier vehicle having chassis capable of moving over uneven or spongy surfaces and surmounting obstacles that is easy to handle, convenient to use, and folds flat. Particularly, in its various embodiments and implementations, the invention provides for a simple and reliable locking in unfolded and folded states of the chassis and improved portability when folded.

In general, in one aspect, a folding chassis includes a frame having a reference plane, an actuator attached pivotally to said frame, a first mechanism comprising said actuator and a platform attached pivotally to said frame, and a second mechanism comprising said actuator and two arms, each attached to said frame pivotally around a first axis and configured for attaching a wheel arrangement rotatable around a second axis. Said first and second mechanisms configured to move independently of each other between at least a first position, in which said platform generally perpendicular to said frame and said wheel arrangements generally perpendicular to said reference plane, and a second position, in which said platform adjacent to said frame and said wheel arrangements adjacent and parallel to said reference plane. Various embodiments and implementations of this aspect of the invention include the following features:

The first and second mechanisms configured to have said platform and said arms locked in said first position. The folding chassis further comprising a lever attached rotatable to said frame and configured to lock said actuator in said first and second positions. The wheel arrangement comprises at least one wheel. The wheel arrangement comprises a plurality of wheels rotatable around axes parallel to said second axis. The first mechanism is a single degree of freedom plain linkage. The second mechanism is a single degree of freedom three-dimensional linkage. Each of the said first axes is positioned at acute angles to said reference plane and to a plane perpendicular to said reference plane. The arms are directionally biased from said first position to said second position.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention.

FIGS. 3A-3C depict respectively perspective, back, and side views of an embodiment shown in FIG. 1B in folded position.

DETAILED DESCRIPTION

Figure 1A:
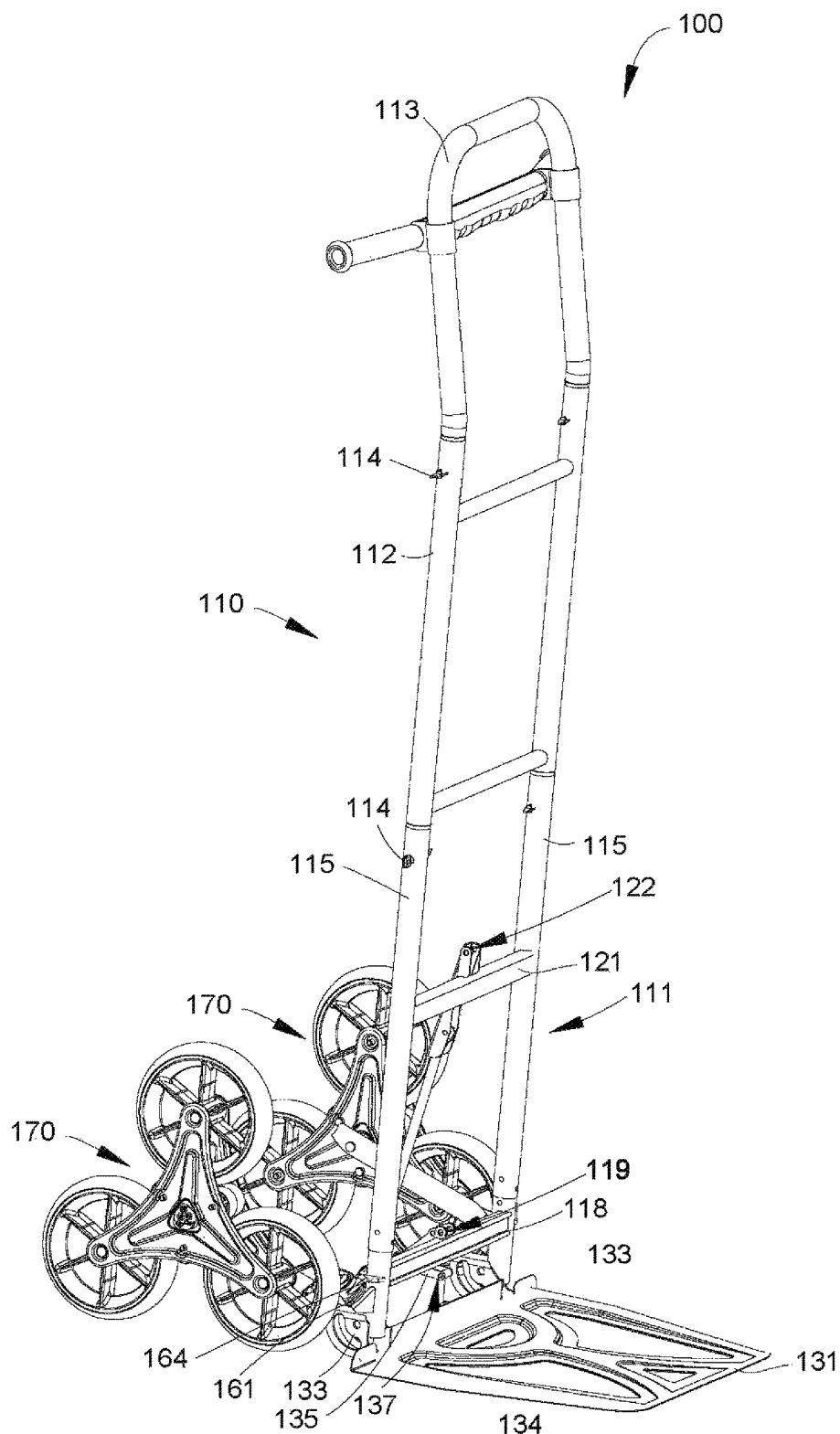
FIG. 1A depicts a perspective view of an embodiment of a hand truck chassis in unfolded state according to present invention.
Figure 1B:
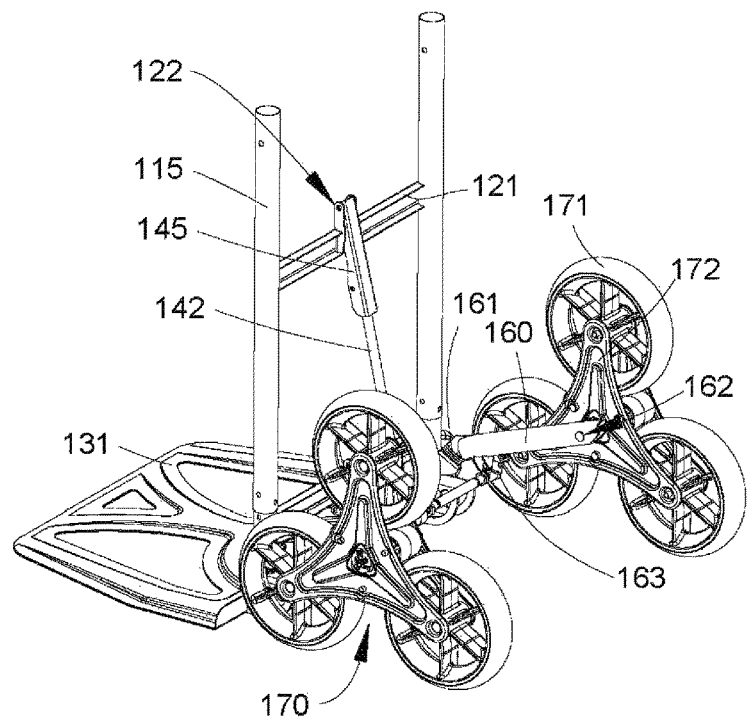
FIG. 1B depicts a perspective view of the embodiment shown in FIG. 1A with a frame extension and a handle not shown.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings. Set forth for better clarity small details, fasteners for example, not shown and in symmetrical structures, like reference characters may generally refer to like functioning mirrored parts as well as the same parts.

Referring to FIGS. 1A-3C, in one embodiment, a symmetrical frame 110 of a hand truck 100 includes a base 111, an extension 112, a handle 113, and connecting pins 114. Base 111 comprises posts 115 with bearings 116 and axles 117, a tie 118 with bearings 119 and 120, and a tie 121 with a bearing 122. The bearings 119, 120, and 122 may be holes or pins as integral parts of the ties 118 and 121 or attached components.

First mechanism 130 comprises the base 111 as a ground, a primary driving lever 140 having concave spherical nests 141 and pivotally attached to the bearing 119, a platform 131 with a bearing 132, and links 134, 135, and 136. The platform 131, generally at a ground level, pivotally attached by brackets 133 to the coaxial bearings 116 and by the bearing 132 to the link 134, which connected to the link 135 by pivot 137. Link 135 pivotally placed onto the bearing 120 and connected by the link 136 to the lever 140. All links' connections are pivotal.

Second mechanism 150 comprises the base 111 as a ground, the lever 140, arms 160, and pushers 151. Each of the arms 160 pivotally installed onto the corresponding axle 117 with torsion springs 161 for balancing a moment appearing in the mechanism 150 during motions. Wheel arrangements 170, which may comprise wheels 171 within sides 172, placed rotatable onto cantilevered axles 162 of the arms 160. Convex spherical ends of pushers 151 captured in the nests 141 of the lever 140 and in the corresponding concave spherical nests 163, which may be integral parts of the arms 160 or attached components.

Axes of the axles 117 in this particular embodiment form acute angles with a reference plane 110a (not shown) of the frame 110 and planes perpendicular to it, for example the symmetry plane and the platform 131. As used herein, the reference plane 110a is a plane defined by the axis of the bearings 116 and general proximity to the frame 110. The reference plane 110a is not a feature of the chassis but a predetermined arbitrary design parameter for establishing folded positions of the arms 160 with wheel arrangements 170 relative to the frame 110, which generally is not planar. Pivoting of the arms 160 in unfolded position is limited by stops 164 to the wheel arrangements 170 being generally parallel to the symmetry plane.

Rod 142 connected to a pivot 143 of the lever 140 and a pivot 144 of a secondary driving lever 145, which attached to the base 111 by the bearing 122. Methods and means of fixing positions of one part relative to another well known in the art so, those of ordinary skill in the art will readily envision a variety of other means and/or structures for performing functions described above.

Referring to FIGS. 4A-5C, in another embodiment, a cart 200 differs from the hand truck 100 by a platform 231 positioning above ground level and having a pivotally attached support 238 with links 239 pivotally connecting the support 238 with a base 211. In this embodiment, a link 234 pivotally connected to a bearing 232 of the platform 231 and a primary driving lever 240. First mechanism 230 in this embodiment comprises the base 211 as a ground, the lever 240, the platform 231, the support 238, and the links 234 and 239. The lever 240 differs from the lever 140 only by positioning of the link 234 attachment compared to same of the link 136.

Figure 6:
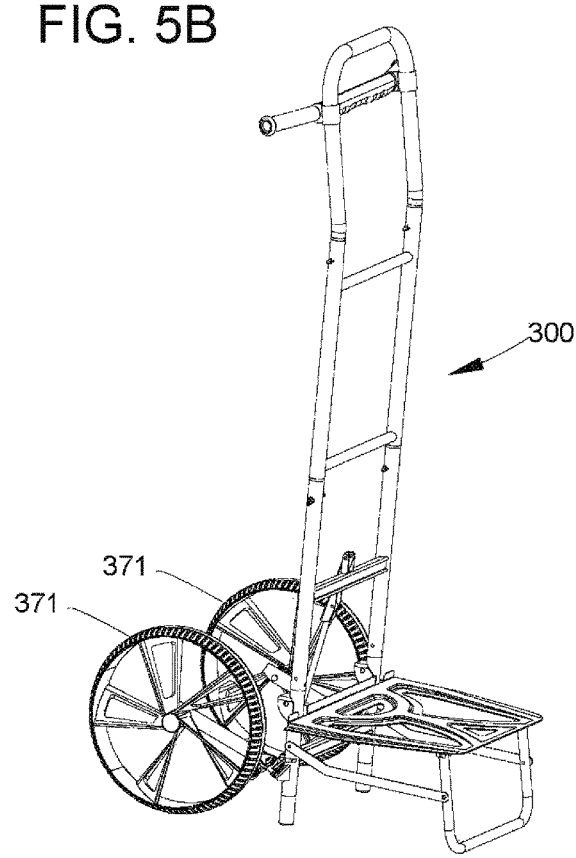
FIG. 6 depicts a perspective view of another embodiment of the cart chassis according to present invention.

Referring to FIG. 6, in yet another embodiment, a cart 300 differs from the cart 200 by having large diameter wheels 371 instead of the wheel arrangements 170. When the cart is pulled/pushed over a mud or sand, greater wheel diameter provides advantage of reducing the force necessary for creating sufficient torque for moving due to it being applied to wheel axles, which, in this instance, are at a greater distance from a point of contact with the ground.

Figure 2A:
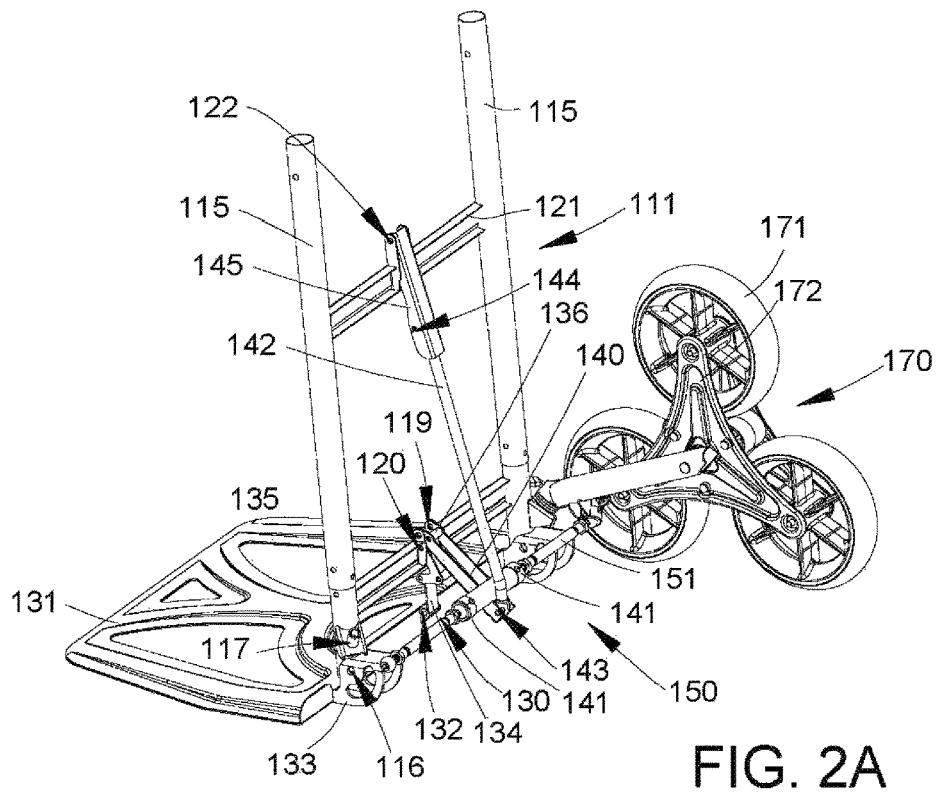
FIGS. 2A-2C depict a perspective view of an embodiment shown in FIG. 1B with an arm and wheel-hub on one side not shown in respectively unfolded, partially folded and folded positions.
Figure 2B:
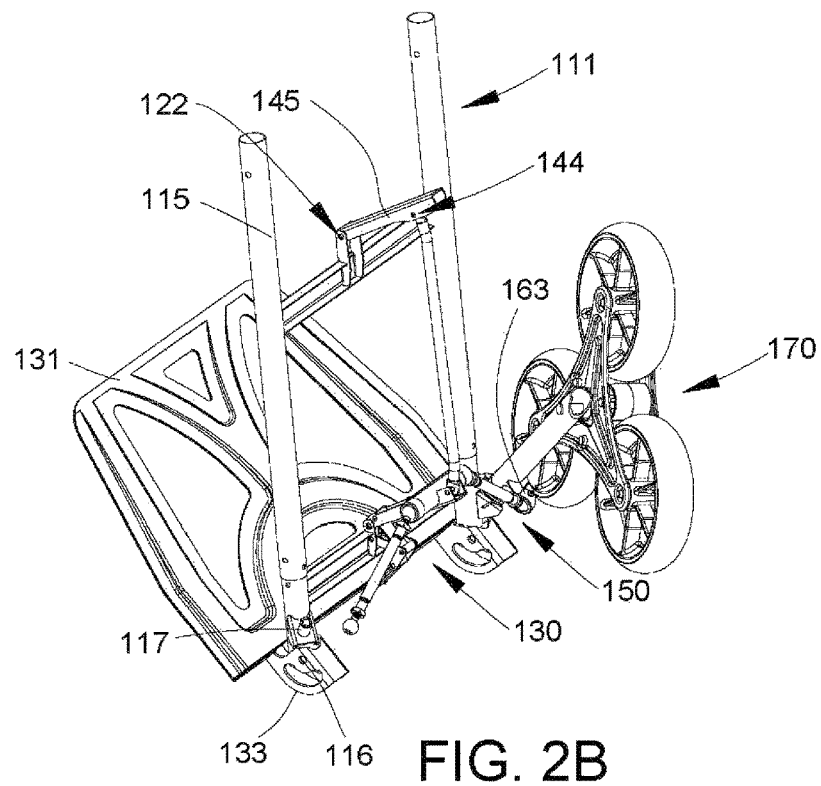
Figure 2C:
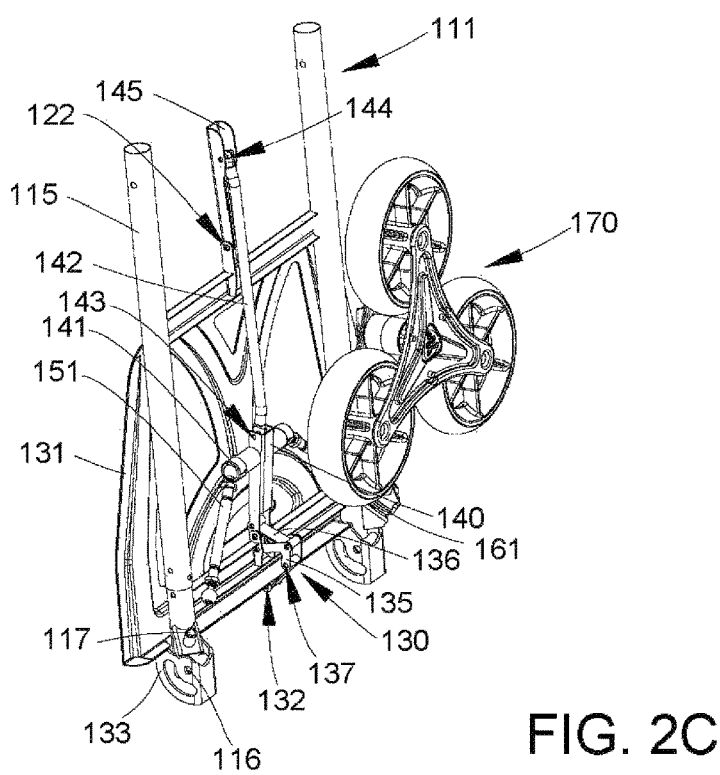
Figure 4A:
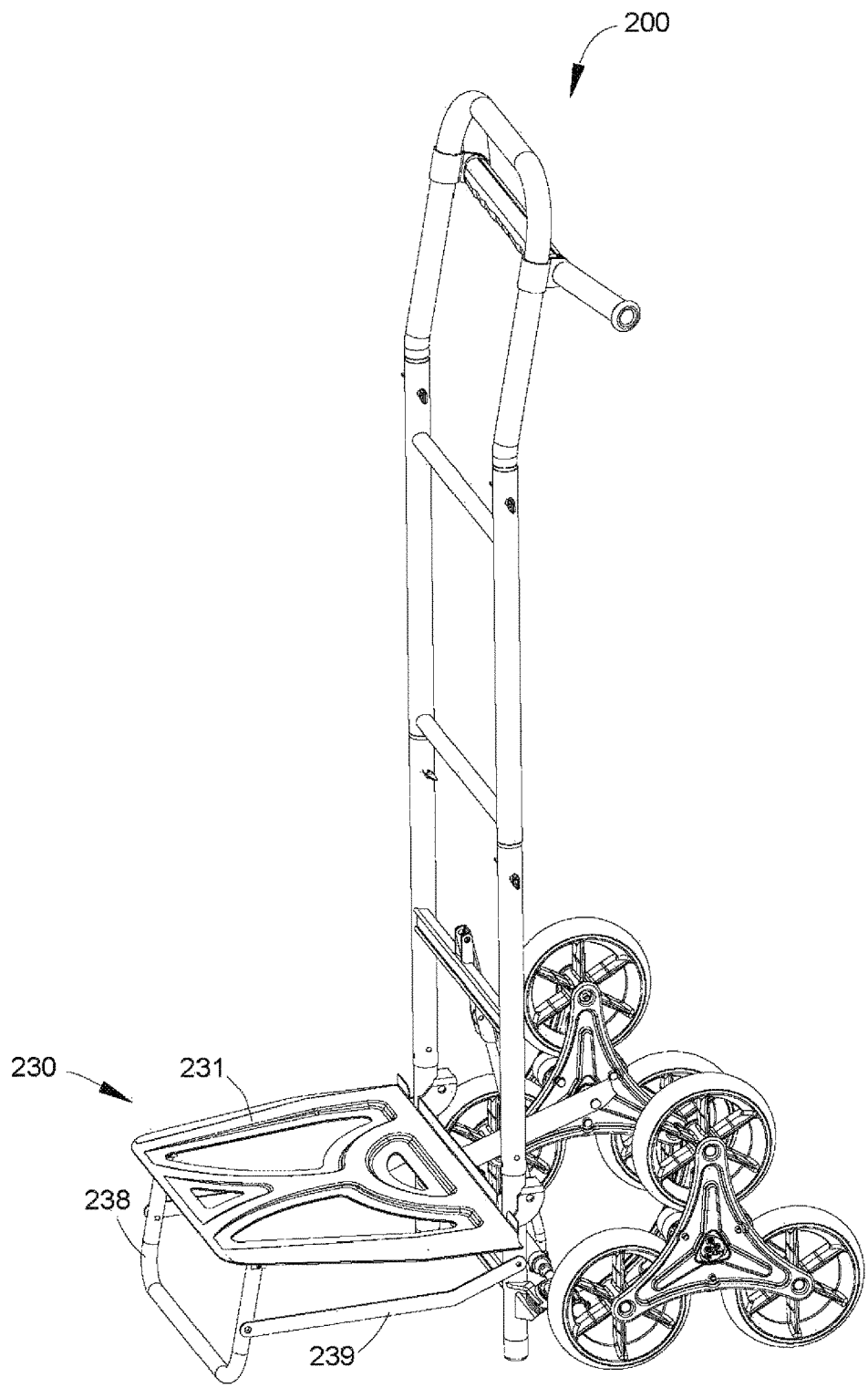
FIG. 4A depicts a perspective view of an embodiment of the cart chassis in unfolded state according to present invention.
Figure 4B:
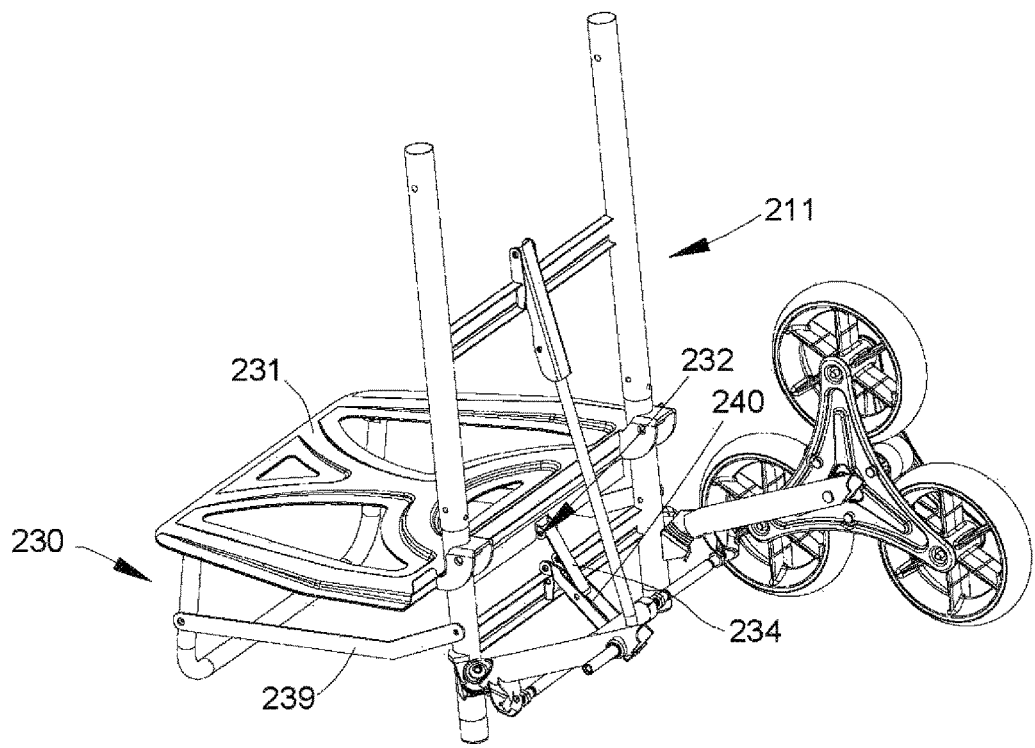
FIG. 4B depicts a perspective view of the embodiment shown in FIG. 4A with the frame extension, wheel-hub on one side, and the handle not shown.
Figure 5A:
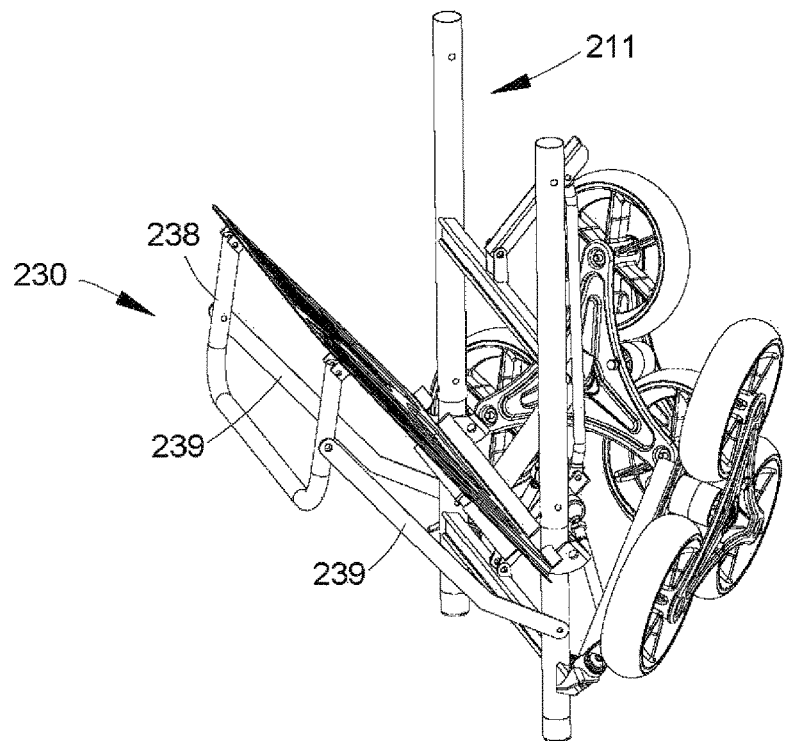
FIGS. 5A-5C depict respectively a perspective view in partially folded position and back and side views in folded position of an embodiment shown in FIG. 4B.
Figure 5B:
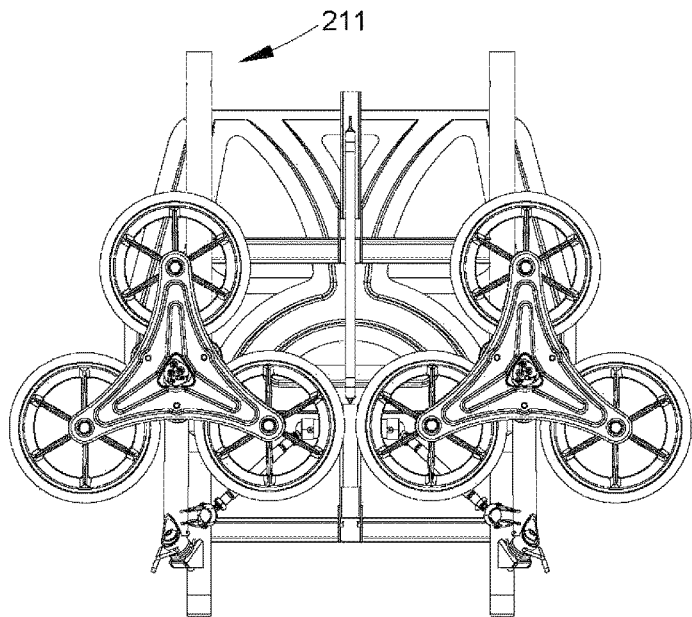
Figure 5C:
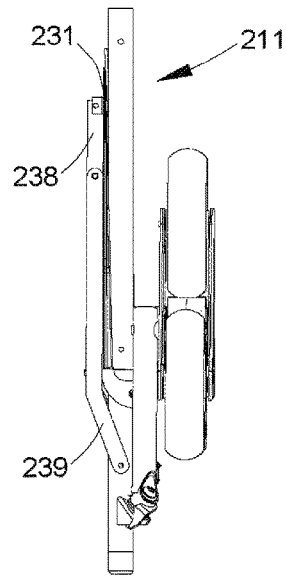

FIGS. 2A-2C depict the hand truck 100 in various phases of folding. In unfolded chassis 100, the pivot 137 driven slightly past a line between the bearings 120 and 132 of the base 111 and the platform 131 respectively, which prevents the platform 131 from folding. Similarly, the nests 141 of the lever 140 driven slightly past a line between the nests 163 that locks arms 160 between the base 111 and the lever 140. At the same time, the pivot 144 of the lever 145 driven past a line between the bearing 122 of the base 111 and the pivot 143 of the lever 140 preventing the latter from rotating. Folding action is initiated by rotating the lever 145, which pulls the lever 140 by the rod 142. The lever 140 affects the mechanisms 130 and 150 unlocking and pulling the platform 131 through the links 136, 135, and 134 and the arms 160 through pushers 151. During the folding, the platform 131 turns from being perpendicular to being close to the base 111 that may be for greater than the right angle. Accordingly, arms 160 turn from the wheel arrangements 170 being parallel to the symmetry plane to being side by side and parallel to the reference plane. In folded chassis 100, the pivot 144 of the lever 145 driven in opposite direction past a line connecting the bearing 122 and the pivot 143 latching the lever 140 in folded state.

FIGS. 4B and 5A-5C depict the cart 200 in various phases of folding. It differs only in respect to the mechanism 230, which folds the platform 231 by the lever 240 pushing it through the link 234 that, in turn, rotates the support 238 toward the platform 231 by links 239.

Consequently, the present invention provides for improved folding chassis with independently lockable platform's and wheels' positions in both folded and unfolded states. Furthermore, the invention provides that such chassis folds relatively flat for better handling and storage in the folded state. Moreover, the present invention facilitates greater convenience of operating manually driven carrier vehicles including one hand easy folding/unfolding and stable structure for loading/unloading operations.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

Accordingly, as indicated above, the foregoing embodiments of the invention are examples and can be varied in many ways.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one". As used herein, the term "about" refers to a +/−10% variation from the nominal value. It is to be understood that such a variation is always included in any given value provided herein, whether or not it is specifically referred to.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. It should also be understood that, unless clearly indicated to the contrary, in any methods disclosed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

I claim:

1. A folding chassis comprising:
   a frame having a reference plane;
   an actuator attached pivotally to said frame;
   a first mechanism comprising said actuator and a platform attached pivotally to said frame; and
   a second mechanism comprising said actuator and two arms, each attached to said frame pivotally around a first axis and having a wheel arrangement attached hereto rotatable around a second axis,
   wherein said first and second mechanisms configured to be initiated by said actuator simultaneously and move independently of each other between at least a first position, in which said platform generally perpendicular to said frame and said wheel arrangements generally perpendicular to said reference plane, and a second position, in which said platform adjacent to said frame and said wheel arrangements adjacent and parallel to said reference plane.

2. The folding chassis of claim 1, wherein said first and second mechanisms configured to have said platform and said arms locked in said first position.

3. The folding chassis of claim 1, further comprising a lever attached pivotally to said frame and configured to lock said actuator in said first and second positions.

4. The folding chassis of claim 1, wherein said wheel arrangement comprises at least one wheel.

5. The folding chassis of claim 1, wherein said wheel arrangement comprises a plurality of wheels rotatable around axes parallel to said second axis.

6. The folding chassis of claim 1, wherein said first mechanism is a single degree of freedom plain linkage.

7. The folding chassis of claim 1, wherein said second mechanism is a single degree of freedom three-dimensional linkage.

8. The folding chassis of claim 1, wherein each of said first axes positioned at acute angles to said reference plane and to a plane perpendicular to said reference plane.

9. The folding chassis of claim 1, wherein said arms directionally biased from said first position to said second position.

\* \* \* \* \*